United States Patent [19]

York

[11] Patent Number: 5,024,555
[45] Date of Patent: Jun. 18, 1991

[54] SUB-SURFACE IRRIGATION SYSTEM

[76] Inventor: Richard D. York, 8062 Aster Ave., Yucca Valley, Calif. 92284

[21] Appl. No.: 506,086

[22] Filed: Apr. 9, 1990

[51] Int. Cl.$^5$ .................................................. E02B 13/00
[52] U.S. Cl. ....................................... 405/48; 405/44; 405/46
[58] Field of Search .................. 405/36, 39, 40, 43, 405/44, 46, 48; 239/542

[56] References Cited

U.S. PATENT DOCUMENTS

| 3,292,378 | 12/1966 | Rosenthal | 405/48 |
| 3,302,408 | 2/1967 | Schmid | 405/44 |
| 3,333,422 | 8/1967 | Neyland | 405/48 |
| 3,426,544 | 2/1969 | Curtis | 405/44 |
| 3,442,087 | 5/1969 | Riusech | 405/39 |
| 3,518,831 | 7/1970 | Tibbals et al. | 405/37 |
| 3,966,233 | 6/1976 | Diggs | 405/48 |
| 4,086,774 | 5/1978 | Duggins | 405/39 |
| 4,153,380 | 5/1979 | Hartman | 405/39 |
| 4,193,711 | 3/1980 | Riusech | 405/39 |
| 4,402,631 | 9/1983 | Rosenthal | 405/48 |
| 4,577,997 | 3/1986 | Lehto et al. | 405/43 |

Primary Examiner—David H. Corbin
Attorney, Agent, or Firm—Harvey S. Hertz

[57] ABSTRACT

A sub-surface irrigation system includes a conduit connected to a water supply. A plurality of fluid dispenser units are connected to the conduits. Each of the fluid dispenser units include a connector interconnected at one end to the interior of the conduit. The other end of the connector is coupled to a drip emitter positioned at one end of an elongated casing. The elongated casing has an enlarged opening at one end and a reduced opening formed at the other end. Tubing interconnects the other end of the connector to the casing. The drip emitter is positioned in the tubing adjacent the casing reduced opening end.

1 Claim, 1 Drawing Sheet

SUB-SURFACE IRRIGATION SYSTEM

BACKGROUND OF THE INVENTION

1. Field of the Invention

The field of art to which the invention pertains includes the field of sub-surface irrigation systems, and more particularly, to an irrigation system which can be readily secured to a standard conduit mounted or positioned in the ground.

2. Description of the Prior Art

Conventional sub-surface irrigation systems modify a conventional conduit through which water flows. For example, in U.S. Pat. No. 4,402,631, nozzles are spaced along a conduit and a flap integrally formed with the conduit are used to cover the outlet water nozzles. Thus, when the conduit is buried, the flaps can be used to protect the nozzles and prevent the nozzles from being clogged with earth. Water will flow freely and not be obstructed by the flap. However, such an arrangement requires modification of the conduit itself.

Other similar arrangements are shown in U.S. Pat. No. 3,966,233 which utilizes a swatch which is wrapped around the conduit to shield the nozzle from against the entry of dirt as well as to spread water over a slightly greater area that would be accomplished if the swatch were not wrapped around the nozzle.

Other known prior art includes U.S. Pat. Nos. 3,302,408; 3,426,544; 3,333,422; 3,518,831; 3,292,378; 3,442,087; and 4,577,997.

The present invention utilizes a drip emitter which can be easily coupled to a conventional conduit. Should the drip emitter or the connecter coupling the drip emitter to the conduit fail, these items can be easily replaced.

SUMMARY OF THE INVENTION

A sub-surface irrigation system having a conduit connected to a water supply and a plurality of fluid dispenser units connected to the conduit. Each of the dispenser units comprises a connecter interconnected at one end to the interior of the conduit and the other end of the connector being coupled to a drip emitter positioned in an elongated casing. The elongated casing has an enlarged opening at one end and a reduced opening formed at the other end. Tubing interconnects the other end of the connector to the casing. The drip emitter is positioned in the tubing adjacent reduced opening end thereof.

The advantages of this invention, both as to its construction and its mode of operation, will be readily appreciated when the same becomes better understood with respect to the accompanying drawings in which the like reference numerals indicate like parts throughout the figures.

DESCRIPTION OF THE PREFERRED EMBODIMENT

Figure 1:
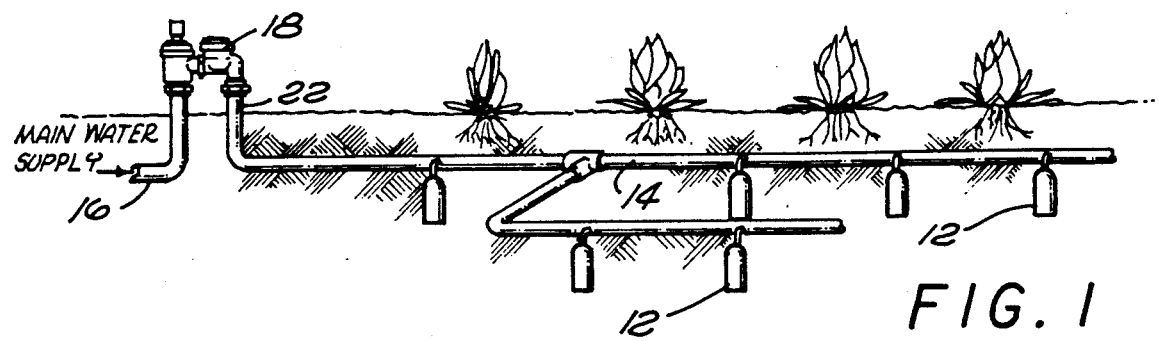
FIG. 1 is a perspective view of the sub-surface irrigation system according to the present invention and utilizing the fluid dispenser units of the present invention.

Referring now to the drawings there is shown in FIG. 1, a sub-surface distribution system for irrigation having fluid dispenser units 12 constructed in accordance with principles of the invention. The fluid dispenser units 12 are illustrated connected to a conventional conduit 14 buried beneath the ground. Water from a supply 16 is fed through a valve 18 to an above ground conduit 22 which in turn is connected to the conduit 14. Water in the conduit 14 is dispensed into the ground via the fluid dispensing units 12 which will be described in greater detail hereinafter.

It should be understood, that although a single conduit 14 is illustrated, a plurality of conduits could be connected to the water supply 16 and valve 18. In addition, it should be understood that the system could also operate by means of an automatic valve system in place of the mechanical valve 18 illustrated in FIG. 1.

Figure 2:
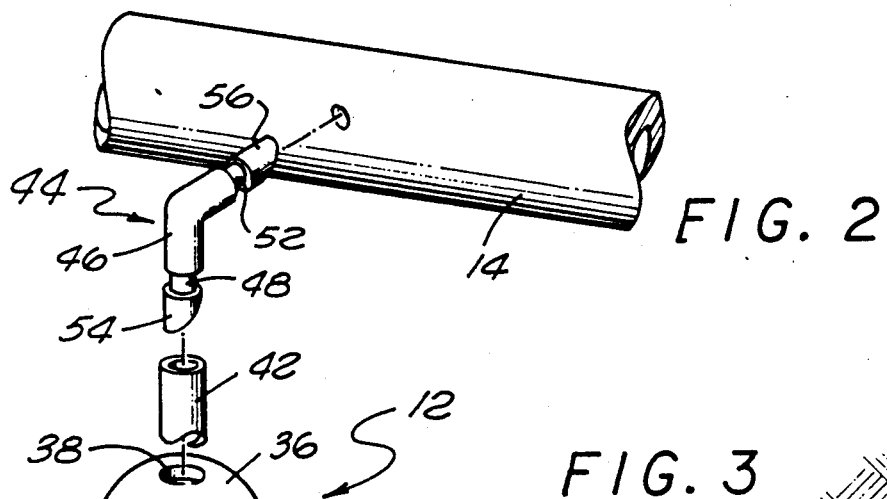
FIG. 2 is an enlarged fragmentary sectional view of a typical arrangement of a conduit supplying water to a fluid dispenser unit.
Figure 3:
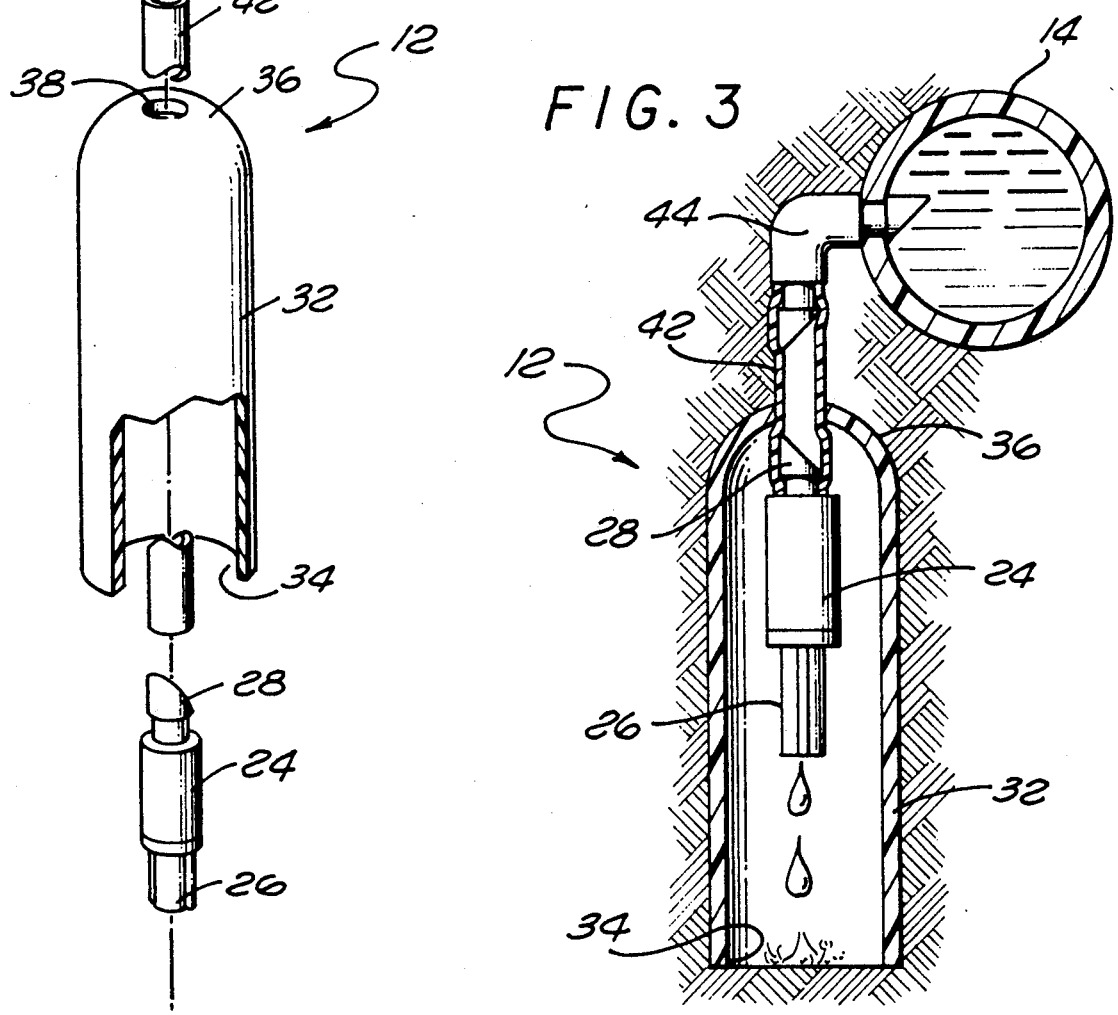
FIG. 3 is a cross-sectional view taken along the line 3—3 of FIG. 1.

Referring now to FIGS. 2 and 3, a fluid dispensing unit 12 is shown in greater detail connected to the conduit 14. The fluid dispensing unit 12 includes a conventional drip emitter 24 having an outlet end 26 and an inlet end 28. As can be seen clearly in FIG. 3, the drip emitter 24 is positioned in a casing 32. The casing 32 is illustrated as being formed of an elongated cylinder having an open end 34 and a closed end 36 which contains a reduced diameter opening 38. Tubing 42 extends through the casing reduced diameter opening 38 and forms a tight seal therewith.

The drip emitter inlet end 28 extends into the tubing 42 positioned within the casing 32. As shown in FIG. 3, a drip emitter 24 is mounted so that its outlet end 26 is substantially recessed from the casing open end 34.

A ninety degree connector 44 interconnects the main line conduit 14 to the tubing 42. The connector 44 contains an L-shaped elbow 46 having reduced diameter necks 48 and 52 extending from each end thereof, respectively. The reduced diameter necks 48 and 52 in turn are each connected to enlarged angled free end piercing heads 54 and 56, respectively.

The connector 44 is connected to the main line conduit 14 by puncturing a hole therein and inserting the free end head 56 therein until the neck 52 is adjacent the conduit wall surface as can be seen in FIG. 3. This arrangement normally forms a water tight seal between the connector 44 and the main line conduit 14. The other end head 54 is inserted into the tubing extending through the exterior of the casing 32.

In normal assembly, the tubing 42 is inserted through the casing opening 38 until the free end thereof extends below the casing open end 34. The drip emitter inlet end 28 is then inserted into the tubing 42 free end. The tubing 42 is then pulled back through the casing 32 until the drip emitter inlet end is adjacent the casing opening 38 as shown in FIG. 3. The tubing 42 is then cut so that a sufficient length is available to attach the connector neck 48 and free end head 54 therein as shown in FIG. 3. Then the connector 44 is attached to the conduit as shown in FIG. 3.

Normally drip irrigation systems are used in time intervals i.e. once or twice per day, and the moisture will have a chance to drain completely from the casing 32 after each interval. Thus, roots or other growth are not likely to grow into the casing. Further, the casing acts as a protector so that the drip emitter cannot become clogged. Unlike other prior art systems, the present invention requires no modification of the main line conduit 14 as the connector 44 is attached directly to the conduit.

While a 90 degree connector 44 has been illustrated, it should be understood that the 90 degree elbow is not necessary as a straight or other angled connector could be used for connection to the side of the conduit 14 or on the bottom of the conduit.

It should be understood that the drip emitter 24 is for illustrative purposes only and that other types of drip emitters could be used.

The present invention eliminates certain of the problems of above ground systems, that of malicious or unintentional destruction of sprinkler systems by both people and animals.

I claim:

1. For use in a sub-surface distribution system for irrigation having a conduit connected to a water supply, a plurality of fluid dispenser units connected to said conduit, each of said fluid dispenser units comprising:

a connector interconnected at one end to the interior of said conduit and the other end of said connector being coupled to a drip emitter being substantially recessed wholly in the interior of one end of an elongated hollow casing;

said elongated hollow casing having an enlarged opening at one and thereof and a reduced opening at the other end thereof adjacent which said drip emitter is positioned; and tubing interconnecting the other end of said connector to said casing a portion of said drip emitter positioned in said tubing adjacent said casing reduced opening end, said casing enlarged opening communicating directly with growth, said casing acting as a protection for preventing said drip emitter from being clogged.

* * * * *